(12) United States Patent
Owens, II et al.

(10) Patent No.: US 11,002,303 B2
(45) Date of Patent: May 11, 2021

(54) FASTENER-RETAINING SYSTEM AND METHOD

(71) Applicant: Illinois Tool Works Inc., Glenview, IL (US)

(72) Inventors: Ronald C. Owens, II, Frankfort, KY (US); Jeremy R. D. Tuttle, Dearborn, MI (US); Chad M. Clark, Stamping Ground, KY (US)

(73) Assignee: Illinois Tool Works Inc., Glenview, IL (US)

( * ) Notice: Subject to any disclaimer, the term of this patent is extended or adjusted under 35 U.S.C. 154(b) by 347 days.

(21) Appl. No.: 15/736,566

(22) PCT Filed: Jun. 15, 2016

(86) PCT No.: PCT/US2016/037688
§ 371 (c)(1),
(2) Date: Dec. 14, 2017

(87) PCT Pub. No.: WO2016/205412
PCT Pub. Date: Dec. 22, 2016

(65) Prior Publication Data
US 2018/0142714 A1  May 24, 2018

Related U.S. Application Data

(60) Provisional application No. 62/181,874, filed on Jun. 19, 2015.

(51) Int. Cl.
*F16B 43/02* (2006.01)
*F16B 5/02* (2006.01)
(Continued)

(52) U.S. Cl.
CPC .............. *F16B 5/0283* (2013.01); *F16B 5/02* (2013.01); *F16B 5/0275* (2013.01); *F16B 19/02* (2013.01); *F16B 37/0842* (2013.01)

(58) Field of Classification Search
CPC ....................................................... F16B 5/0283
(Continued)

(56) References Cited

U.S. PATENT DOCUMENTS 2,936,805 A * 5/1960 Rice ......................... F16B 39/24
411/135
3,032,370 A * 5/1962 Moore ................. B60G 99/004
296/35.1

(Continued)

FOREIGN PATENT DOCUMENTS

CN     102341613 A     2/2012
CN     103649567 A     3/2014
(Continued)

OTHER PUBLICATIONS

International Search Report and Written Opinion for PCT/US2016/037688.

*Primary Examiner* — Gary W Estremsky
(74) *Attorney, Agent, or Firm* — Quarles & Brady LLP

(57) ABSTRACT

A fastener-retaining system (100) is configured to securely couple a fastener (102) to a substrate (104). The fastener-retaining system (100) includes a compression-limiting bushing (106) including a tube defining a central passage (132), and a retainer (130) positioned within the central passage. The retainer (130) includes a first portion that securely connects to the bushing, and a second portion that is configured to securely connect to a portion of the fastener.

16 Claims, 7 Drawing Sheets

(51) Int. Cl.
*F16B 19/02* (2006.01)
*F16B 37/08* (2006.01)

(58) Field of Classification Search
USPC ........ 411/546, 107, 109, 112, 135, 175, 353
See application file for complete search history.

(56) References Cited

U.S. PATENT DOCUMENTS

| | | | |
|---|---|---|---|
| 4,621,961 A | 11/1986 | Gulistan | |
| 4,732,519 A * | 3/1988 | Wagner | F16B 5/0258 403/14 |
| 4,802,802 A * | 2/1989 | Thurner | E04F 13/0837 411/107 |
| 4,975,008 A * | 12/1990 | Wagner | F02B 77/00 411/337 |
| 5,244,325 A * | 9/1993 | Knohl | F02B 77/00 411/107 |
| 5,328,311 A | 7/1994 | Knohl | |
| 5,395,184 A * | 3/1995 | Gagliano | E02D 5/00 405/229 |
| 5,395,194 A * | 3/1995 | Johnson | F16B 5/025 29/525.11 |
| 5,489,177 A * | 2/1996 | Schmidt, Jr. | F16B 41/002 411/369 |
| 5,533,237 A * | 7/1996 | Higgins | F16B 5/065 24/289 |
| 6,039,525 A * | 3/2000 | Johnson | F16B 41/002 411/353 |
| 6,280,132 B1 * | 8/2001 | Szczukowski | F02M 35/10078 411/353 |
| 6,457,925 B1 * | 10/2002 | Genick, II | F16B 41/002 411/339 |
| 6,478,519 B1 * | 11/2002 | Genick, II | F16B 5/0258 411/353 |
| 6,582,171 B2 * | 6/2003 | Bondarowicz | F16B 21/18 411/353 |
| 6,676,345 B2 * | 1/2004 | Szczukowski | F16B 5/0241 411/533 |
| 7,210,885 B2 * | 5/2007 | Pinzl | F16B 37/005 411/353 |
| 8,061,948 B2 * | 11/2011 | DeGelis | F16B 5/0233 411/546 |
| 10,550,876 B2 * | 2/2020 | Slater | F16B 41/002 |
| 2010/0303582 A1 * | 12/2010 | Choi | B62D 27/065 411/366.1 |
| 2013/0071203 A1 * | 3/2013 | Hay | F16B 5/0258 411/111 |
| 2013/0142588 A1 | 6/2013 | Slater et al. | |
| 2014/0096362 A1 * | 4/2014 | Staley | F16B 5/0283 29/525.02 |
| 2014/0161562 A1 * | 6/2014 | Dechant | F16B 37/0842 411/500 |
| 2015/0139749 A1 * | 5/2015 | Metten | F16B 41/00 411/114 |
| 2015/0330435 A1 * | 11/2015 | Schwarzbich | F16B 39/24 411/16 |

FOREIGN PATENT DOCUMENTS

| | | |
|---|---|---|
| WO | WO 2013/009804 | 1/2013 |
| WO | WO 2013/085790 | 6/2013 |

\* cited by examiner

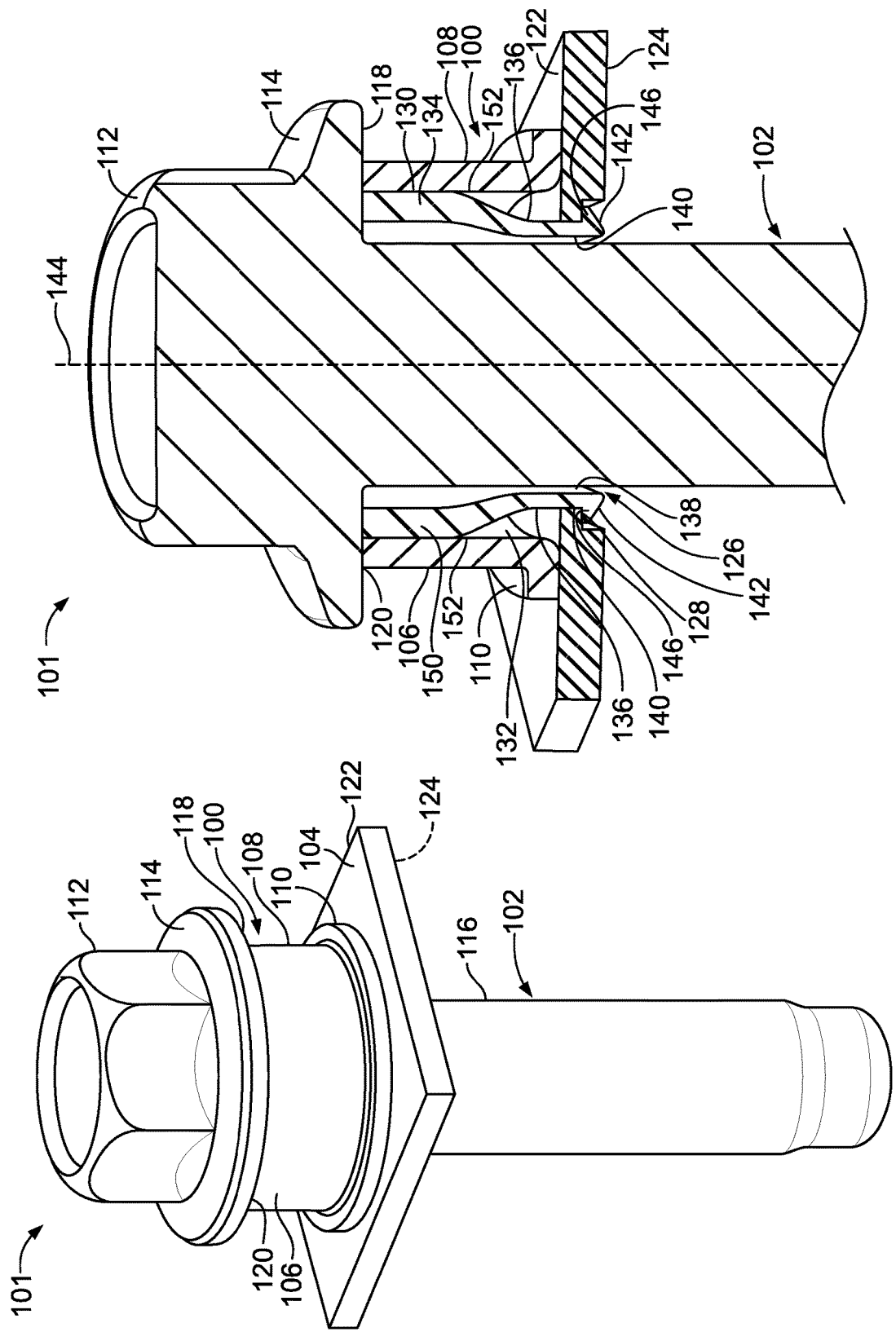

FASTENER-RETAINING SYSTEM AND METHOD

RELATED APPLICATIONS

This application is a National Phase of International Application No. PCT/US2016/037688, filed Jun. 15, 2016, which relates to and claims priority benefits from U.S. Provisional Patent Application No. 62/181,874 entitled "Fastener-Retaining System and Method," filed Jun. 19, 2015, both of which are hereby incorporated by reference in their entireties.

FIELD OF EMBODIMENTS OF THE DISCLOSURE

Embodiments of the present disclosure generally relate to systems and methods of securely retaining a fastener, and, more particularly, to systems and methods of securely coupling a fastener to a substrate.

BACKGROUND

Various assemblies include panels or objects connected to one another. Automobile assemblies, for example, include various panels and structures connected to other panels or structures, or to the automobile frame itself. Fasteners (such as bolts) are typically used to secure various components together.

In various applications, fasteners of different sizes, shaped, configuration and/or the like are used to secure components together. In order to accommodate longer fasteners and/or fasteners at different positions, metal strips may be spot-welded or a metal spacer may be mechanically crimped to a flanged area of a component in order to thicken a clamped joint under a head of a bolt. As can be appreciated, the welding and/or crimping adds time and cost to a manufacturing process. Moreover, a specialized tool may be needed to secure the fastener to the components.

SUMMARY OF EMBODIMENTS OF THE DISCLOSURE

A need exists for an efficient, cost-effective system and method for accommodating fasteners at a variety of different positions. A need exists for a system and method for capturing a fastener (such as a bolt) and securing the fastener to a component. A need exists for a system and method for capturing a fastener in a component without the need for specialized tooling for installation.

With those needs in mind, certain embodiments of the present disclosure provide a fastener-retaining system that is configured to securely couple a fastener to a substrate. The fastener-retaining system includes a compression-limiting bushing including a tube defining a central passage, and a retainer positioned within the central passage. The retainer includes a first portion that securely connects to the bushing, and a second portion that is configured to securely connect to a portion of the fastener. The retainer is configured to be securely positioned between an interior surface of the bushing and an outer surface of the fastener.

The retainer may include at least one securing member that is configured to securely couple to the substrate. The securing member(s) may include at least one ramped surface and a catch that is configured to latch onto the substrate. The retainer may also include at least one extension leg extending from a retaining wall. The securing member(s) may extend from a distal end of the extension leg(s).

The retainer may include a retaining wall that includes the first portion and the second portion. In at least one embodiment, the retaining wall includes at least one outwardly-extending securing member.

The first portion may include one or more outwardly-directed segments that directly abut into an interior surface of the bushing. The second portion may include one or more inwardly-directed segments that are configured to directly abut into an outer surface of the portion of the fastener. The retaining wall may have a clover shape.

Certain embodiments of the present disclosure provide a securing system that includes a fastener including a head connected to a shaft, and a substrate including a first surface and a second surface opposite from the first surface. A hole is formed through the substrate from the first surface to the second surface. A fastener-retaining system securely couples the fastener to the substrate. The fastener-retaining system includes a compression-limiting bushing including a tube defining a central passage. The bushing is positioned between the head of the fastener and the first surface of the substrate. A retainer is positioned within the central passage of the bushing. The retainer includes a first portion that securely connects to the bushing, and a second portion that is configured to securely connect to the shaft of the fastener.

BRIEF DESCRIPTION OF SEVERAL VIEWS OF THE DRAWINGS

FIG. 1 illustrates a perspective front view of a fastener-retaining system securing a fastener to a substrate, according to an embodiment of the present disclosure.

FIG. 2 illustrates an axial cross-sectional view of a fastener-retaining system securing a fastener to a substrate, according to an embodiment of the present disclosure.

Figure 3:
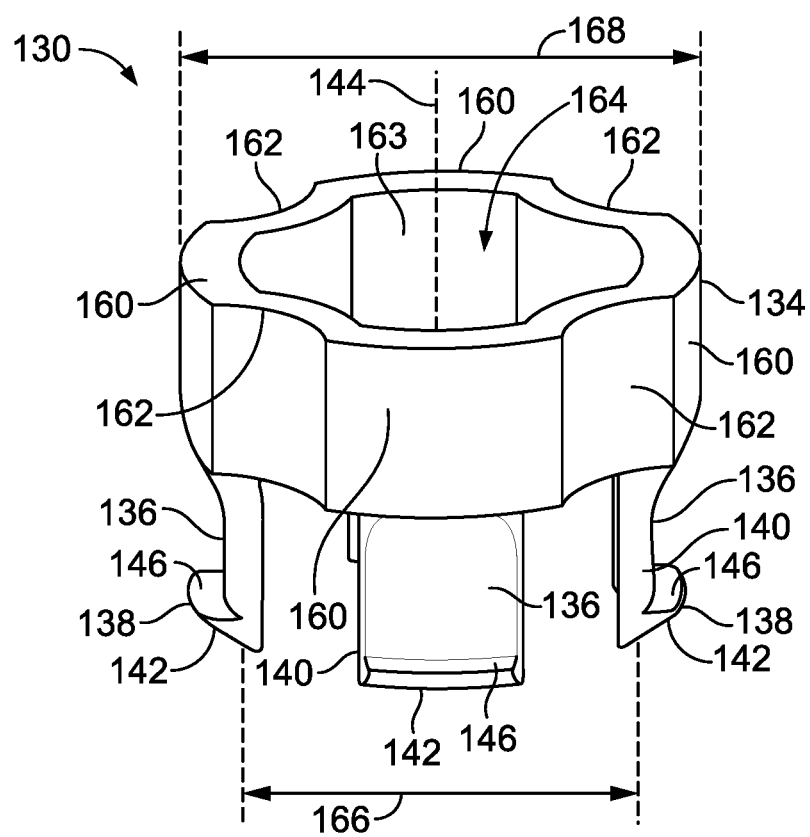
FIG. 3 illustrates a perspective front view of a retainer, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Certain embodiments of the present disclosure provide a fastener retainer, which may be formed of an injection molded plastic or other such material. The retainer may be configured to interact with a drawn metal compression-limiting bushing. The retainer is configured to be securely connected to a bore of the bushing. The bushing is configured to secure a fastener to a substrate, such as piece of sheet metal.

The fastener-retaining system and method may include a bushing and a retainer. The system provides a robust connection to a substrate. The height of the bushing creates an increased amount of initial clamping force that does not need to utilize an additional bushing or spacer. The strength, robustness, and clamping force are due, at least in part, to an increased amount of bolt stretch, for example.

The retainer leads to cost savings for a manufacturer because current known methods of obtaining added bolt stretch are achieved through spot welding large metal strips of thick material and/or mechanically crimping spacers to a flanged area of a component in order to thicken a clamped joint under a head of a bolt.

The retainer may be formed of plastic, and may include an upper portion (such as a main body) that interacts with a fastener and an inner portion of a metal bushing. A segmented or clover-shaped feature may be used to retain the fastener inside the bushing. In at least one embodiment, legs extend below the bottom surface of the bushing. The legs may include snap members that snapably secure into a hole of a substrate. The upper portion of the retainer also allows for the fastener to be presented in a vertically-oriented position, for example.

FIG. 1 illustrates a perspective front view of a fastener-retaining system 100 securing a fastener 102 to a substrate 104, according to an embodiment of the present disclosure. The fastener-retaining system 100, the fastener 102, and the substrate 104 cooperate to provide a securing system 101 for securely coupling the fastener 102 to the substrate 104. The fastener-retaining system 100 includes a compression-limiting bushing 106 that couples to a retainer (hidden from view in FIG. 1). The bushing 106 may be formed of a metal, and includes an annular tube 108 connected to an out-turned flange 110. The flange 110 circumferentially extends from a lower end of the tube 108. The tube 108 defines a central passage into which the retainer is secured. As shown, the bushing 106 includes the flange 110 at one end, such as a lower end. Optionally, the bushing 106 may include the flange 110 at an opposite end. In at least one other embodiment, the bushing 106 may include flanges at both ends.

The fastener 102 may be a bolt, for example. The fastener 102 includes a head 112 connected to a collar 114. A shaft 116 extends from an end of the head 112 and the collar 114. At least a portion of the shaft 116 be externally threaded. The shaft 116 is coaxial with the head 112 and the collar 114. As shown, a lower surface 118 of the collar abuts into an upper edge 120 of the tube 108 of the bushing 106. The shaft 116 of the fastener 102 passes through a central passage of the retainer of the fastener-retaining system 100.

The substrate 104 may be a flat sheet or panel formed of metal, plastic, or the like. The substrate 104 defines a hole (hidden from view in FIG. 1) extending between and through opposite surfaces 122 and 124 (such as a top surface and a bottom surface). The bushing 106 abuts into the surface 122 and is positioned over the hole of the substrate. The shaft 116 extends through the hole. The fastener-retaining system 100 securely connects the fastener 102 to the substrate 104.

FIG. 2 illustrates an axial cross-sectional view of the fastener-retaining system 100 securing the fastener 102 to the substrate 104, according to an embodiment of the present disclosure. As shown, the substrate 104 defines the hole 126. The diameter of the hole 126 proximate to the surface 122 may be less than the diameter of the hole 126 proximate to the surface 124. A ledge 128 may be formed within the substrate 104. The ledge 128 may be parallel with the surfaces 122 and 124. The ledge 128 provides an undercut portion that leads to the expanded diameter of the hole 126 proximate to the surface 124.

The fastener-retaining system 100 includes the bushing 106 and the retainer 130 within the interior central passage 132 defined by the bushing 106. The retainer 130 includes a retaining wall 134 that surrounds a circumference of a portion of the shaft 116. The retaining wall 134 includes inwardly-directed segments that abut into an outer surface of the shaft 116. Extension legs 136 extend downwardly from the retaining wall 134. Securing members 138 (such as snaps, ramps, latches, clasps, clamps, or the like) are located at distal ends 140 of the extension legs 136.

The securing members 138 snapably secure to the substrate 104. As the retainer 130 is urged into the hole 126 of the substrate, ramped surfaces 142 of the securing members 138 slide over interior edges of the substrate 104 that define the hole 126. The ramped surfaces 142 inwardly and downwardly cant towards a central longitudinal axis 144 of the fastener-retaining system 100. As the ramped surfaces 142 slide over the interior edges of the substrate 104, the extension legs 136 are squeezed inwardly, due to the diameter of the hole 126 being less than the span between the extension legs 136. As the ramped surfaces 142 are urged past the reduced diameter and engage the ledge 128 (and or underside of the substrate 104), the extension legs 136 flex back to at-rest positions, and a catch 146 (such as a ledge, straight edge, blunt surface, or the like) of the ramped surface 142 securely latches onto the ledge 128, thereby securely coupling to the substrate 104.

When the securing members 138 are secured to the substrate 104 as described, an upper edge of the retainer 130 may abut into a portion of the fastener 102, such as the lower surface 118 of the collar 114. Further, the bushing is compressively trapped between the upper surface 122 of the substrate 104 and the portion of the fastener 102, such as the lower surface 118 of the collar 114. Portions of an outer surface 150 (such as outwardly-directed segments, as described below) of the retainer 130 may abut into an interior surface 152 of the bushing 106. In this manner, the bushing 106 securely couples to the retainer 130. Further, the bushing is securely clamped between the head 112 of the fastener 102 and the upper surface 122 of the substrate 104.

Figure 4:
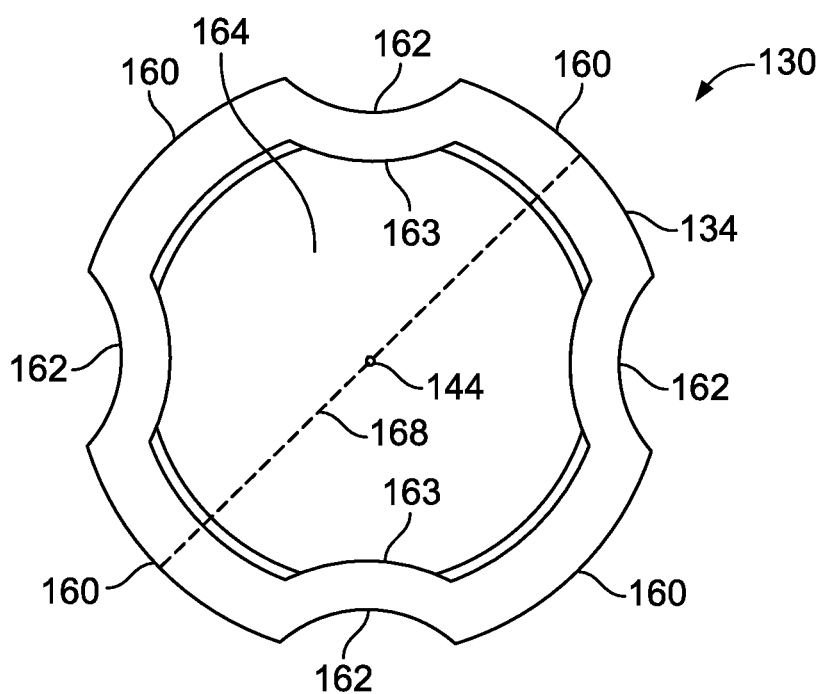
FIG. 4 illustrates a top view of a retainer, according to an embodiment of the present disclosure.

FIG. 3 illustrates a perspective front view of the retainer 130, according to an embodiment of the present disclosure. FIG. 4 illustrates a top view of the retainer 130. Referring to FIGS. 2-4, the retaining wall 134 surrounds a circumference of a portion of the shaft 116. The retaining wall 134 includes outwardly-directed segments 160 integrally connected to inwardly-directed segments 162. As shown, the retaining wall 134 includes four outwardly-directed segments 160 alternately connected to four inwardly-directed segments 162. Alternatively, the retaining wall 134 may include more or less segments 160 and 162 than shown. The outwardly-directed segments 160 abut into an interior surface of the bushing 106, thereby securely bracing the retainer 130 into the bushing 106. The inwardly-directed segments 162 abut into an outer surface of the shaft 116 of the fastener 102.

An interior surface 163 of the retaining wall 134 defines a central passage 164 into which the shaft 116 of the fastener 102 passes. In at least one embodiment, interior surfaces of the inwardly-directed segments 162 are threaded and threadably engage exterior threaded portions of the shaft 116.

As shown in FIGS. 3 and 4, four extension legs 136 extend downwardly from the retaining wall 134. Optionally, more or less extension legs 136 than shown may be used. The securing members 138 (such as snaps, ramps, latches, clasps, clamps, or the like) are located at the distal ends 140 of the extension legs 136.

The extension legs 136 may combine to define an outer envelope 166 having a diameter that is less than a span 168 between opposed outwardly-directed segments 160 of the retaining wall 134. The diameter of the envelope 166 may be equal to or less than the diameter of the hole 126, while the span 168 may be larger than the diameter of the hole 126. As such, the retaining wall 134 may be too large to fit into the hole 126 of the substrate 104.

As the retainer 130 is urged into the hole 126, the ramped surfaces 142 lead the extension legs 136 into the hole 126. As the retainer 130 is urged into the hole 126, the extension legs 136 inwardly deflect, as described above, until the catches 146 abut into the ledges 128 of the substrate 104, at which point the extension legs 136 flex back to (or towards) at rest-positions.

As shown in FIGS. 3 and 4, the retaining wall 134 of the retainer 130 may be clover-shaped. The inwardly-directed segments 162 are arcuately-shaped and inwardly bow towards the central longitudinal axis 144. Interior surfaces 163 of the inwardly-directed segments 162 may be threaded in order to threadably engage an outer threaded portion of the shaft 116 of the fastener 102. The outwardly-directed segments 160 are outwardly bowed (such as in an opposite direction to the inward bowing of the inwardly-directed segments 162) in order to abut into interior surfaces 152 of the bushing 106. The retaining wall 134 provides a main body that is configured to be positioned between the bushing 106 and the shaft 116 of the fastener 102.

The bushing 106 securely couples to the retainer 130 by way of the outwardly-directed segments 160 abutting into interior surfaces of the bushing 106. The inwardly-directed segments 162 securely couple to the shaft 116 of the fastener 102. Further, the securing members 138 secure to the substrate 104, such as by snapably or latchably securing to edge areas that define the hole 126. In this manner, the fastener-retaining system 100 securely retains the fastener 102, and securely clamps to the substrate 104.

Referring to FIGS. 1-4, the fastener-retaining system 100 is configured to securely retain the fastener 102 and securely connect the fastener 102 to the substrate 104. The fastener-retaining system 100 includes the retainer 130 that is configured to be securely connected to the bushing 106. The retainer 130 securely couples to the bushing 106 through one or more portions of the retainer 130 (for example, the outwardly-directed segments 160 of the retaining wall 134) directly contacting (for example, abutting into or otherwise directly connecting to) interior surfaces of the bushing 106. The retainer 130 securely couples to the fastener 102 through one or more portions of the retainer 130 (for example, the inwardly-directed segments 162 of the retaining wall 134) directly contacting exterior surfaces of a portion of the fastener 102 (such as the shaft 116). The securing members 138 of the retainer 130 securely couple to the substrate 104, thereby securely coupling the fastener 102 to the substrate 104.

The fastener-retaining system 100 provides an efficient, cost-effective system for accommodating fasteners at different heights and positions relative to the substrate 104. The fastener-retaining system 100 captures the fastener 102 and couples the fastener 102 to the substrate 104 without the need for separate tools. That is, an individual may couple the fastener-retaining system 100 to the fastener 102 and the substrate 104 by hand.

Figure 5:
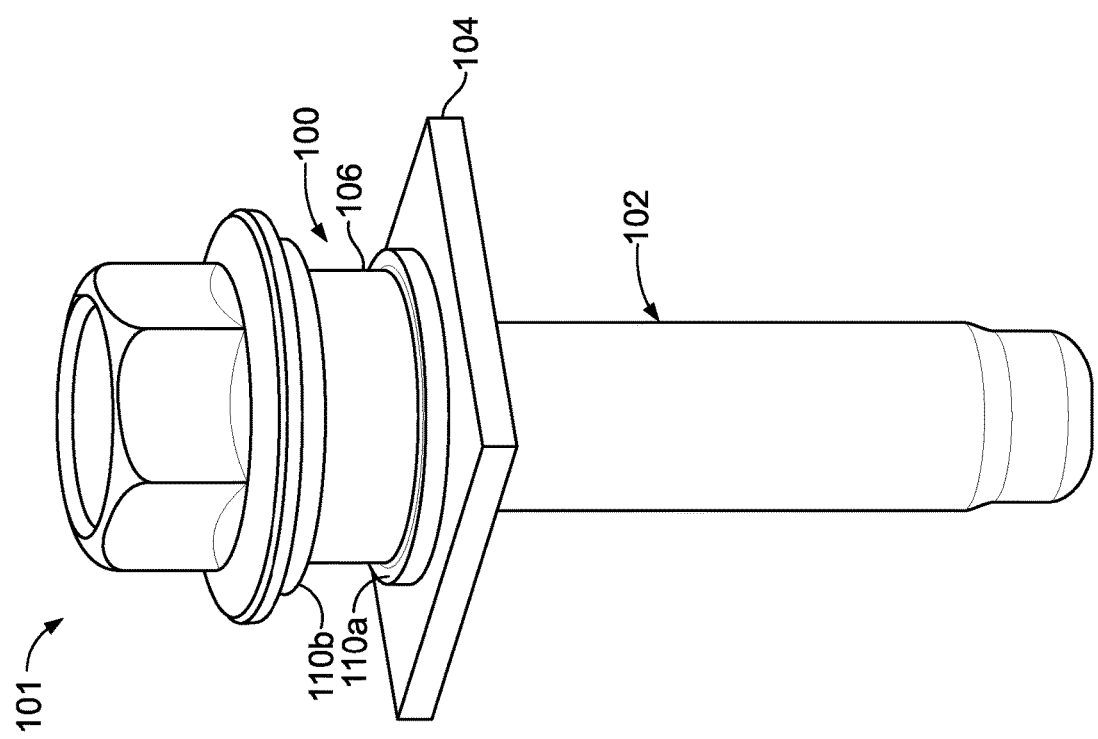
FIG. 5 illustrates a perspective front view of a fastener-retaining system securing a fastener to a substrate, according to an embodiment of the present disclosure.

FIG. 5 illustrates a perspective front view of the fastener-retaining system 100 securing the fastener 102 to the substrate 104, according to an embodiment of the present disclosure. In this embodiment, the bushing 106 may include flanges 110a and 110b at opposite ends.

Figure 6:
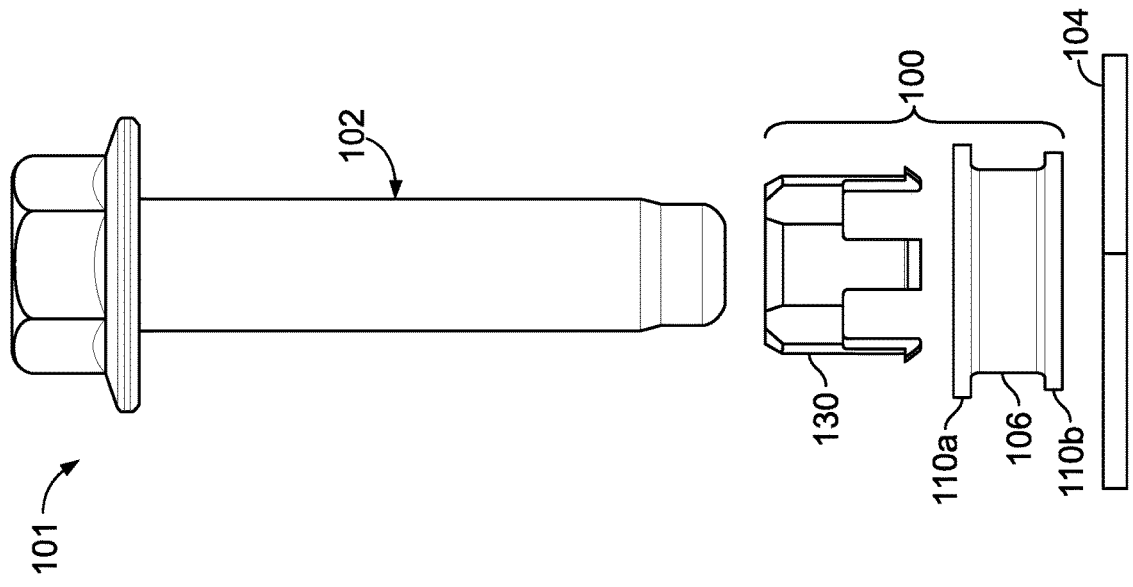
FIG. 6 illustrates a front exploded view of a system for securely coupling a fastener to a substrate, according to an embodiment of the present disclosure.

FIG. 6 illustrates a front exploded view of the securing system 101 for securely coupling the fastener 102 to the substrate 104, according to an embodiment of the present disclosure. The fastener-retaining system 100 includes the bushing 106 and the retainer 130.

Figure 7:
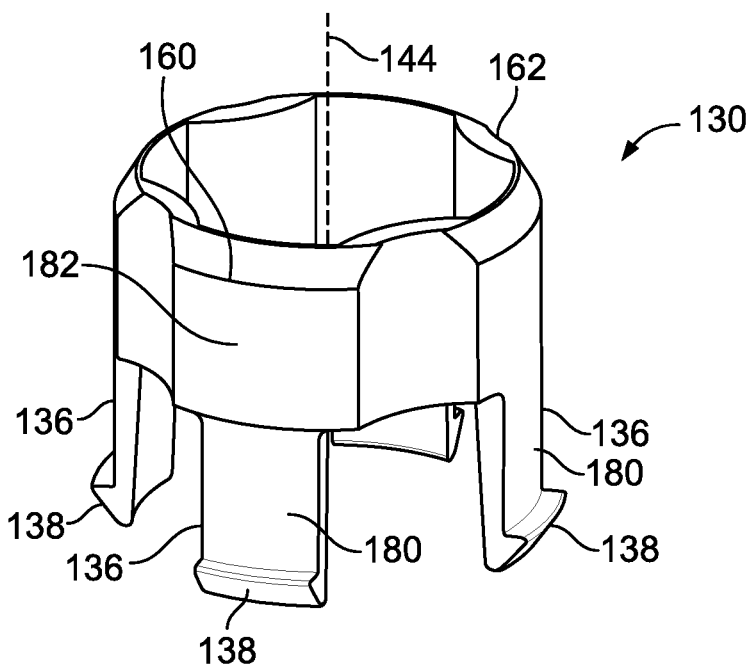
FIG. 7 illustrates a perspective top view of a retainer, according to an embodiment of the present disclosure.
Figure 8:
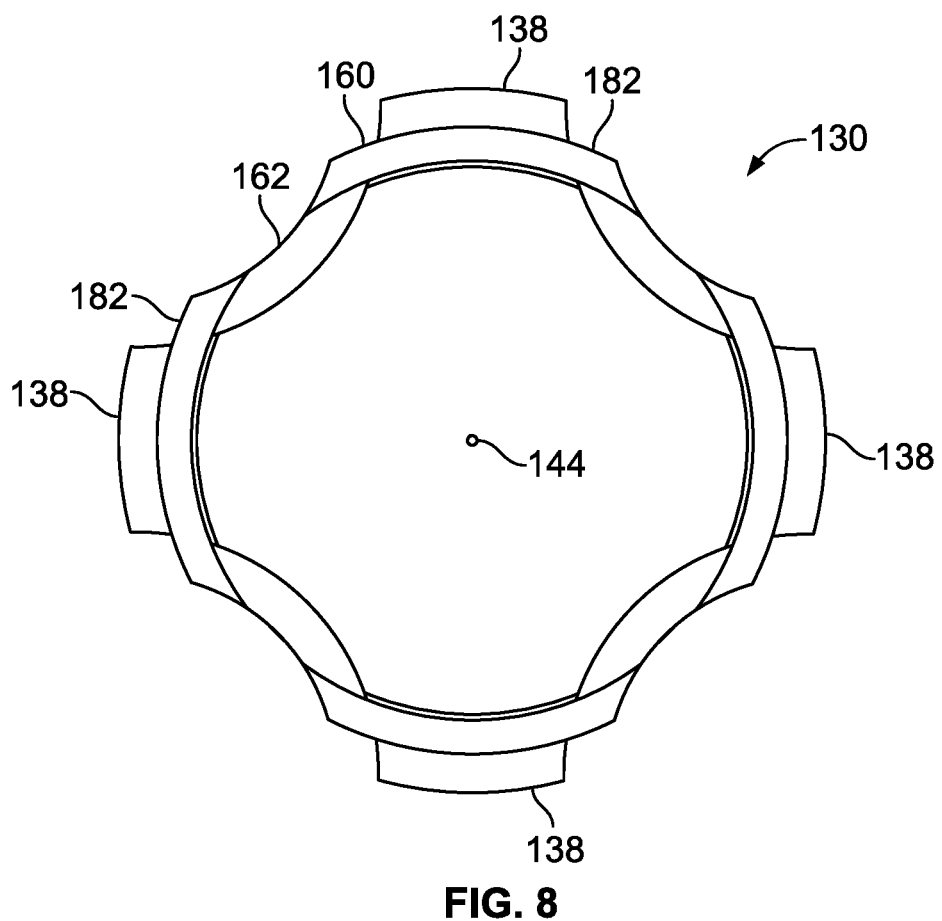
FIG. 8 illustrates a top view of the retainer, according to an embodiment of the present disclosure.

FIG. 7 illustrates a perspective top view of the retainer 130, according to an embodiment of the present disclosure. FIG. 8 illustrates a top view of the retainer 130. The retainer 130 shown in FIGS. 7 and 8 is similar to the retainer shown and described with respect to FIGS. 3 and 4, except that outer surfaces 180 of the extension legs 136 may be flush with outer surfaces 182 of the outwardly-directed segments 160. The securing members 138 may outwardly extend a greater distance from the longitudinal axis 144 than the retaining wall 134. In this embodiment, the securing members 138 are configured to securely latch to the substrate 104, which may include a hole of uniform diameter.

Figure 9:
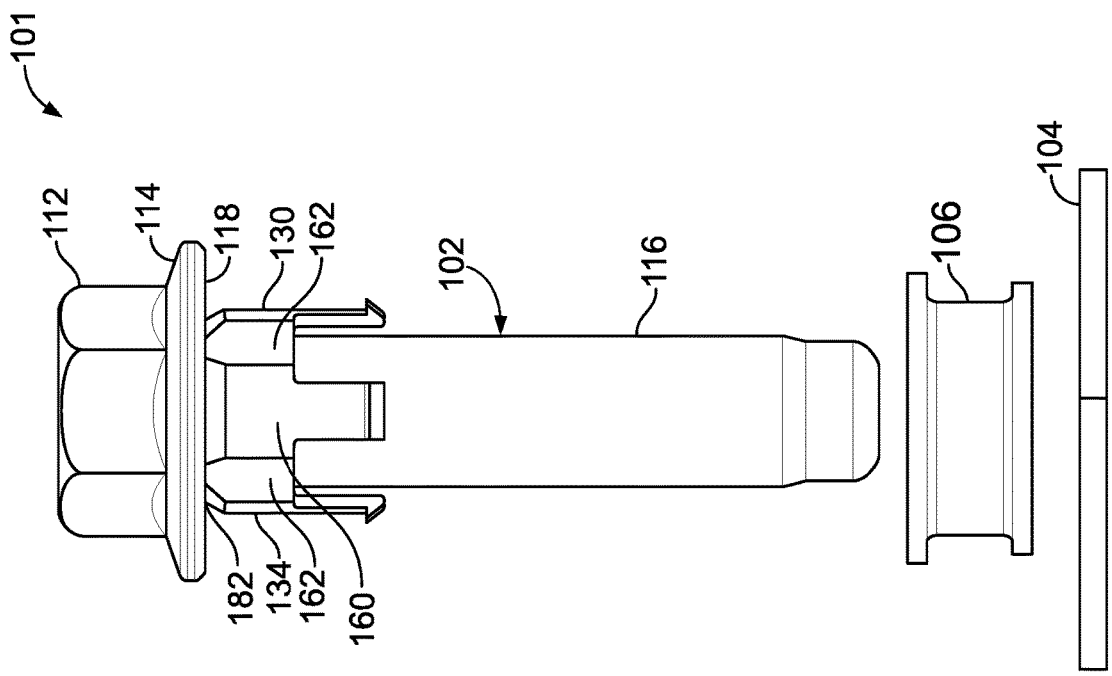
FIG. 9 illustrates a front view of a system for securely coupling a fastener to a substrate in an initial retaining position, according to an embodiment of the present disclosure.

FIG. 9 illustrates a front view of the securing system 101 for securely coupling the fastener 102 to the substrate 104 in an initial retaining position, according to an embodiment of the present disclosure. In the initial retaining position, the retainer 130 is slid onto the shaft 116 of the fastener 102 until an upper edge 182 abuts into a portion of the fastener 102, such as the lower surface 118 of the collar 114. The inwardly-directed segments 162 of the retaining wall 134 abut into outer surfaces of the shaft 116, thereby securely compressing the shaft 116 therebetween. As such, the shaft 116 is securely retained by the retainer 130.

Figure 10:
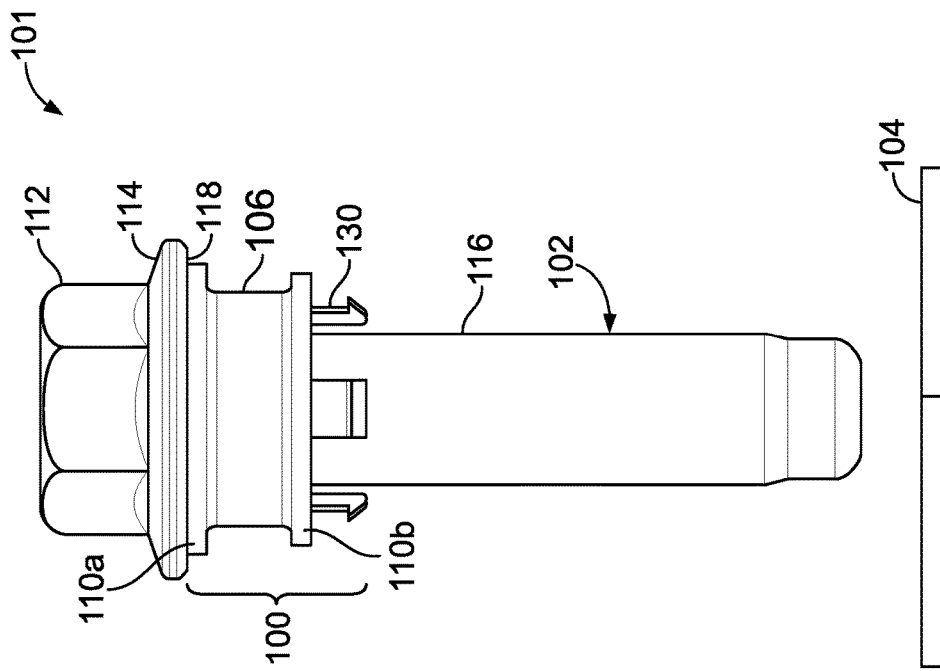
FIG. 10 illustrates a front view of a system for securely coupling a fastener to a substrate in an intermediate position, according to an embodiment of the present disclosure.

FIG. 10 illustrates a front view of the securing system 101 for securely coupling the fastener 102 to the substrate 104 in an intermediate position, according to an embodiment of the present disclosure. In the intermediate position, the bushing 106 is slid over the retainer 130 until the upper flange 110a abuts into the lower surface 118 of the collar 114 of the fastener 102. In this position, the outwardly-directed segments 160 (shown in FIGS. 7-9) abut into the interior surfaces of the bushing 106, thereby securely coupling the bushing 106 to the retainer 130. For example, the outwardly-directed segments 160 may exert an outwardly-directed retaining force into the interior surfaces of the bushing 106. As shown in FIG. 10, in the intermediate position, the extension legs 136 extend the securing members 138 below the bushing 106.

Figure 11:
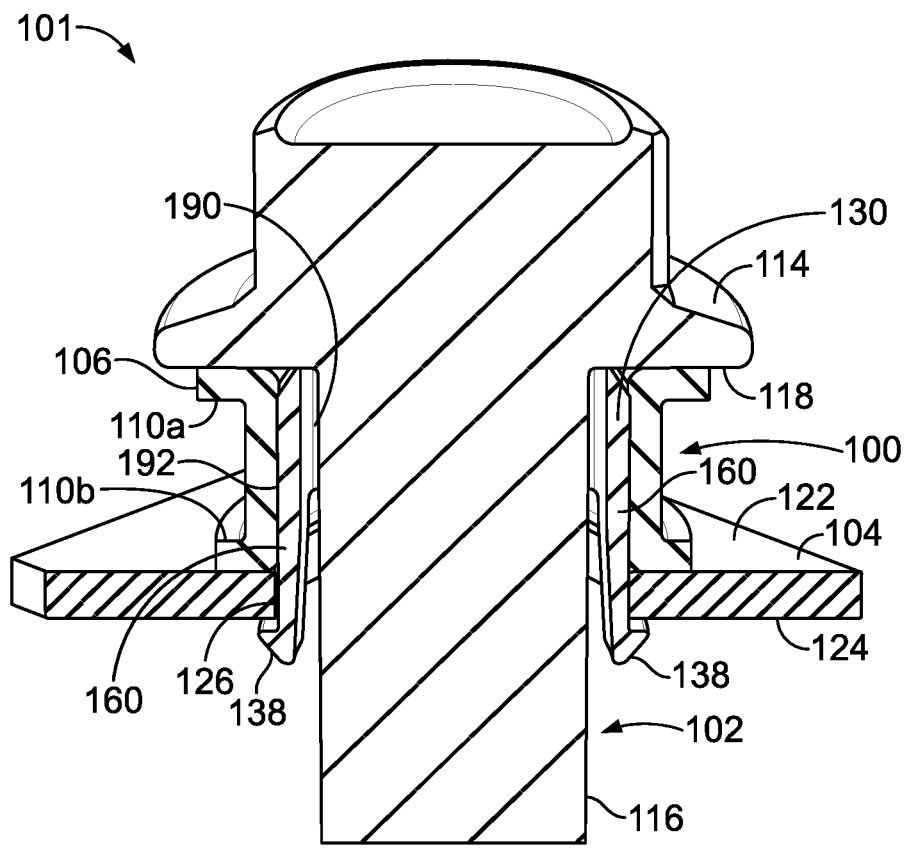
FIG. 11 illustrates an axial cross-sectional view of a fastener-retaining system securing a fastener to a substrate, according to an embodiment of the present disclosure.

FIG. 11 illustrates an axial cross-sectional view of the fastener-retaining system 100 securing the fastener 102 to the substrate 104, according to an embodiment of the present disclosure. The flange 110a of the bushing 106 provides increased support surface area in relation to the lower surface 118 of the collar 114. Similarly, the flange 110b provides increased support surface area in relation to the upper surface 122 of the substrate 104. Alternatively, the bushing 106 may not include the flange 110a and/or the flange 110b.

The hole 126 of the substrate 104 may have a uniform diameter throughout its length. The securing members 138 of the retainer 130 securely latch onto a portion of the lower surface 124 surrounding the hole 126. As shown, gaps 190 may exist between the outwardly-directed segments 160 of the retainer 130 and the shaft 116. As described above, the inwardly-directed segments 162 (shown in FIGS. 7 and 8, for example) abut into the shaft 116.

As shown in FIGS. 5-11, the retainer 130 retains the shaft 116 of the fastener 102 by way of the inwardly-directed segments 162 abutting into the shaft 116. The bushing 106 secures around the retainer 130, such as by way of the outwardly-directed segments 160 abutting into interior surfaces 192 of the bushing 106. Further, the securing members 138 of the retainer 130 securely latch onto the substrate 104.

Referring to FIGS. 5-11, the fastener-retaining system 100 provides an efficient, cost-effective system for accommodating fasteners at various heights and positions relative to the substrate 104. The fastener-retaining system 100 captures the fastener 102 and couples the fastener 102 to the substrate 104 without the need for separate tools. That is, an individual may couple the fastener-retaining system 100 to the fastener 102 and the substrate 104 by hand.

Figure 12:
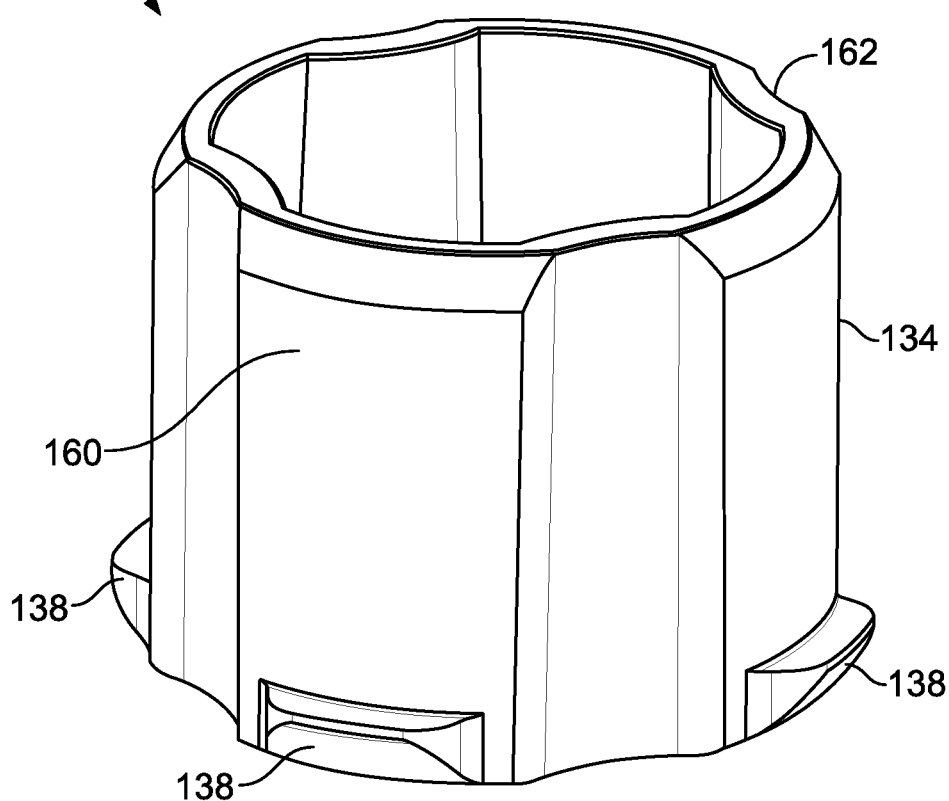
FIG. 12 illustrates a perspective top view of a retainer, according to an embodiment of the present disclosure.

FIG. 12 illustrates a perspective top view of the retainer 130, according to an embodiment of the present disclosure. The retainer 130 is similar to the retainers described above, except that the retainer 130 may not include extension legs. Instead, the securing members 138 may outwardly extend from lower portions of the retaining wall 134. As shown, the securing members 138 may extend from lower outer portions of the outwardly-directed segments 160 of the retaining wall 134. The retainer 130 without the extension legs provides a strong, robust retainer.

Figure 13:
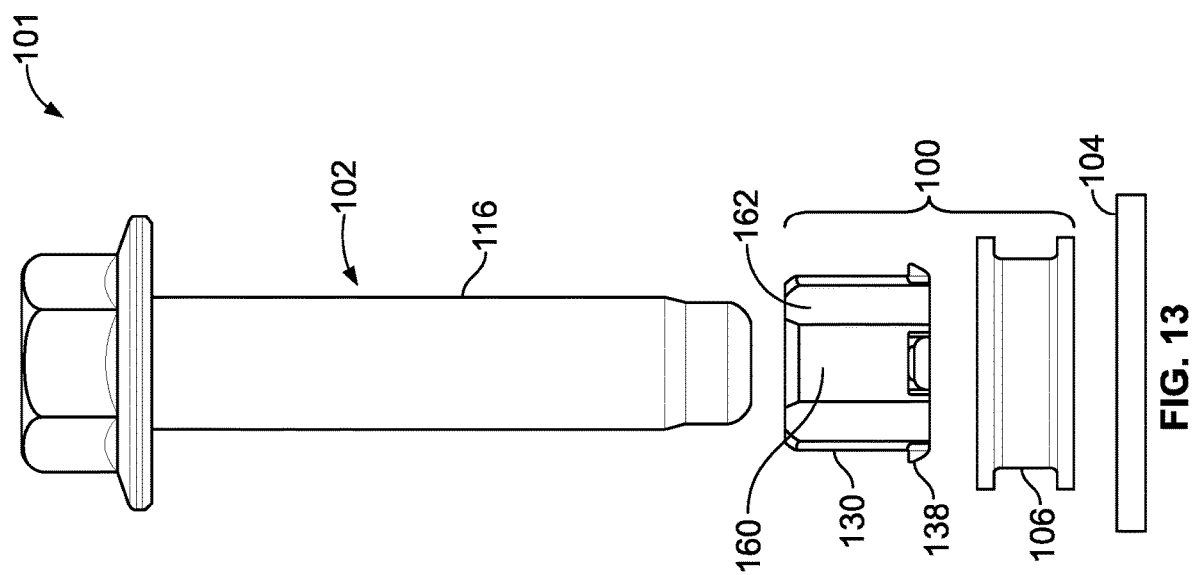
FIG. 13 illustrates a front exploded view of a system for securely coupling a fastener to a substrate, according to an embodiment of the present disclosure.

FIG. 13 illustrates a front exploded view of the securing system 101 for securely coupling the fastener 102 to the substrate 104, according to an embodiment of the present disclosure. The securing members 138 are able to extend through the bushing 106 without the need for extension legs. Alternatively, the retainer 130 may include extension legs, as described above.

Figure 15:
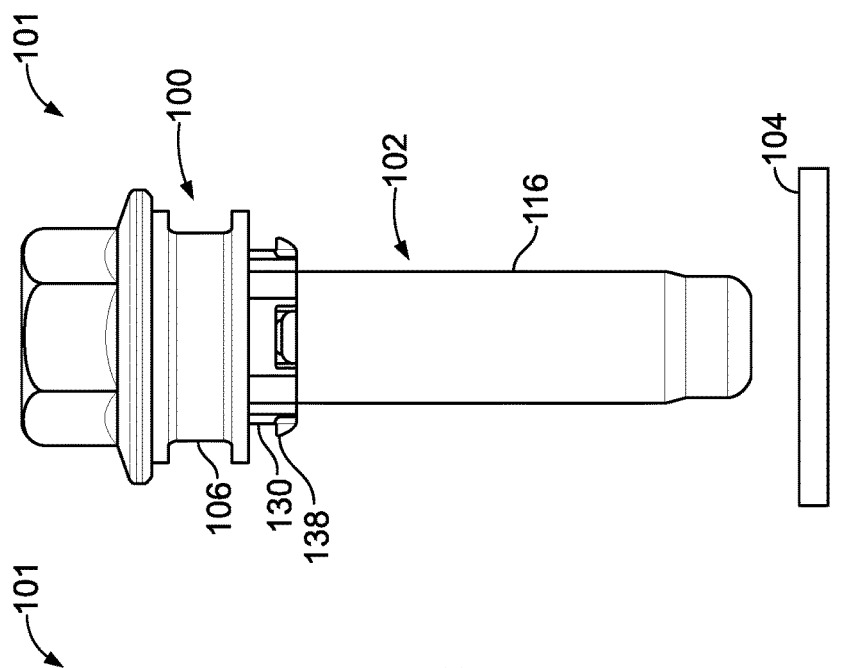
FIG. 15 illustrates a front view of a system for securely coupling a fastener to a substrate in an intermediate position, according to an embodiment of the present disclosure.
Figure 14:
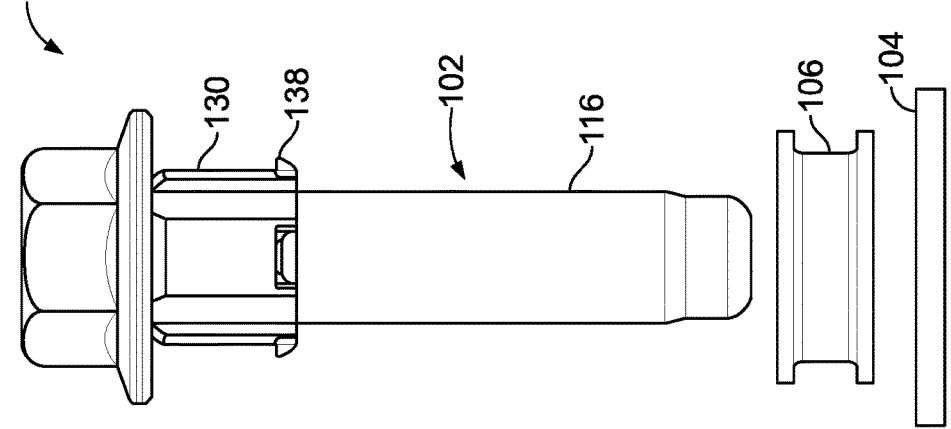
FIG. 14 illustrates a front view of a system for securely coupling a fastener to a substrate in an initial retaining position, according to an embodiment of the present disclosure.

FIG. 14 illustrates a front view of the securing system 101 for securely coupling the fastener 102 to the substrate 104 in an initial retaining position, according to an embodiment of the present disclosure. FIG. 15 illustrates a front view of the securing system 101 for securely coupling the fastener 102 to the substrate 104 in an intermediate position, according to an embodiment of the present disclosure.

As shown in FIGS. 12-15, the retainer 130 is configured to retain the shaft 116 of the fastener 102 by way of the inwardly-directed segments 162 abutting into the shaft 116. The bushing 106 secures around the retainer 130, such as by way of the outwardly-directed segments 160 abutting into interior surfaces of the bushing 106. Further, the securing members 138 of the retainer 130 securely latch onto the substrate 104.

Referring to FIGS. 12-15, the fastener-retaining system 100 provides an efficient, cost-effective system for accommodating fasteners at various heights and positions relative to the substrate 104. The fastener-retaining system 100 captures the fastener 102 and couples the fastener 102 to the substrate 104 without the need for separate tools. That is, an individual may couple the fastener-retaining system 100 to the fastener 102 and the substrate 104 by hand.

Referring to FIGS. 1-15, embodiments of the present disclosure provide fastener-retaining systems including a retainer that is configured to securely couple to a bushing and a fastener. The retainer securely retains the fastener, and allows the fastener to be secured to the substrate. The retainer may be formed of plastic and includes a retaining wall that securely couples to a portion of the fastener (such as a portion of a shaft) and the bushing. For example, inwardly-directed segments of the retaining wall securely abut into the portion of the fastener, while outwardly-directed segments of the retaining wall securely abut into interior surfaces of the bushing. The inwardly-directed segments and the outwardly-directed segments provide a clover-like shape that is configured to retain the fastener inside the metal bushing. One or more securing members (such as ramps) extend from the retainer and are configured to removably secure (for example, snapably or latchably secure) the retainer in relation to a hole of a substrate.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastener-retaining system that is configured to securely couple a fastener to a substrate, the fastener-retaining system comprising:
a compression-limiting bushing including a tube defining a central passage having a longitudinal axis; and
a retainer positioned within the central passage, wherein the retainer includes a first portion that securely connects to the bushing, and a second portion that is configured to securely connect to a portion of the fastener, wherein the second portion includes one or more arcuately-shaped, inwardly-directed segments that bow toward a central longitudinal axis of the retainer and longitudinally extend along the retainer from a first edge to a second edge of the retainer such that the arcuately-shaped, inwardly-directed segments comprise the first edge and second edge, and wherein the one or more inwardly-directed segments are configured to abut an outer surface of the portion of the fastener, and wherein the retainer further comprises at least one securing member that is configured to securely couple to the substrate, the at least one securing member including at least one ramped surface and a catch that is configured to latch onto the substrate.

2. The fastener-retaining system of claim 1, wherein the retainer is configured to be securely positioned between an interior surface of the bushing and an outer surface of the fastener.

3. The fastener-retaining system of claim 1, wherein the retainer further comprises at least one extension leg extending from a retaining wall, wherein the at least one securing member extends from a distal end of the at least one extension leg.

4. The fastener-retaining system of claim 1, wherein the retainer further comprises a retaining wall that includes the first portion and the second portion.

5. The fastener-retaining system of claim 4, wherein the retaining wall comprises at least one outwardly-extending securing member.

6. The fastener-retaining system of claim 4, wherein the first portion includes one or more outwardly-directed segments that directly abut into an interior surface of the bushing, and wherein the second portion includes the one or more inwardly-directed segments that are configured to directly abut into the outer surface of the portion of the fastener.

7. The fastener-retaining system of claim 4, wherein the retaining wall has a clover shape.

8. A securing system comprising:
a fastener including a head connected to a shaft;
a substrate including a first surface and a second surface opposite from the first surface, wherein a hole is formed through the substrate from the first surface to the second surface; and
a fastener-retaining system that securely couples the fastener to the substrate, the fastener-retaining system comprising:
a compression-limiting bushing including a tube defining a central passage, wherein the bushing is positioned between the head of the fastener and the first surface of the substrate; and
a retainer positioned within the central passage of the bushing and defining a central longitudinal axis, wherein the retainer includes a retaining wall comprising a first portion that securely connects to the bushing, and a second portion that is configured to securely connect to the shaft of the fastener, wherein the second portion comprises at least one inwardly-directed segment that is configured to abut an outer surface of the shaft of the fastener, the inwardly-directed segment bowing toward the central longitudinal axis and longitudinally extending along the retainer, and wherein the retainer further comprises one or more securing members that include at least one ramped surface and a catch, the catch being configured to latch onto the substrate.

9. The securing system of claim 8, wherein the retainer is securely positioned between an interior surface of the bushing and an outer surface of the fastener.

10. The securing system of claim 8, wherein the retainer further comprises extension legs extending from a retaining wall, wherein each of the securing members extends from a distal end of respective one of the extension legs.

11. The securing system of claim 8, wherein the retainer further comprises a retaining wall that includes the first portion and the second portion.

12. The securing system of claim 11, wherein the retaining wall comprises at least one outwardly-extending securing member.

13. The securing system of claim 11, wherein the first portion includes outwardly-directed segments that directly abut into an interior surface of the bushing, and wherein the second portion includes inwardly-directed segments that directly abut into an outer surface of the portion of the fastener.

14. The securing system of claim 11, wherein the retaining wall has a clover shape.

15. A fastener-retaining system that is configured to securely couple a fastener to a substrate, the fastener-retaining system comprising:
a compression-limiting bushing including a tube defining a central passage; and
a retainer positioned within the central passage, wherein the retainer is configured to be securely positioned between an interior surface of the bushing and an outer surface of the fastener, wherein the retainer includes:
a clover-shaped retaining wall that defines a central longitudinal axis and includes a plurality of outwardly-directed segments that directly abut into an interior surface of the bushing to securely couple the retainer to the bushing, and a plurality of inwardly-directed segments that are configured to directly abut into an outer surface of a shaft of the fastener to securely connect the bushing to the fastener, wherein each of the inwardly-directed segments bow toward the central longitudinal axis, and wherein each of the inwardly-directed segments alternate with each of the outwardly-directed segments;
securing members that are configured to securely couple to the substrate, wherein each of the securing members comprises at least one ramped surface that is configured to latch onto the substrate.

16. The fastener-retaining system of claim 15, wherein the retainer further comprises extension legs extending from the retaining wall, wherein each of the securing members extends from a distal end of respective one of the extension legs.

* * * * *